United States Patent [19]
Van Der Wal et al.

[11] Patent Number: 6,051,818
[45] Date of Patent: Apr. 18, 2000

[54] ELECTRIC TOASTER WITH ASYMMETRIC HEATING EFFECT

[75] Inventors: Roelf Van Der Wal; Jacob H. Botma, both of Drachten, Netherlands; Wai H. E. Li, Chaiwan; Lawrence S. K. Lai, North Point, both of The Hong Kong Special Administrative Region of the People's Republic of China; Peter S. Viet, Drachten, Netherlands

[73] Assignee: U.S. Philips Corporation, New York, N.Y.

[21] Appl. No.: 09/014,171

[22] Filed: Jan. 27, 1998

[30] Foreign Application Priority Data

Jan. 29, 1997 [EP] European Pat. Off. ............. 97200230

[51] Int. Cl.⁷ ...................................................... H05B 3/02
[52] U.S. Cl. .......................................... 219/486; 219/518
[58] Field of Search ...................... 99/325–335; 219/486, 219/483, 518, 202, 240, 288, 492, 528

[56] References Cited

U.S. PATENT DOCUMENTS

| | | | |
|---|---|---|---|
| 2,705,276 | 3/1955 | Wise | 219/488 |
| 3,247,358 | 4/1966 | Schmidt | 219/240 |
| 3,681,569 | 8/1972 | Schwarz | 219/492 |
| 3,692,975 | 9/1972 | Markus et al. | 219/202 |
| 4,085,309 | 4/1978 | Godel et al. | 392/384 |
| 4,296,312 | 10/1981 | Salem | 219/501 |
| 4,487,115 | 12/1984 | Su | 99/327 |
| 4,538,049 | 8/1985 | Ryckman, Jr. | 219/386 |
| 5,094,154 | 3/1992 | Nopanen | 99/328 |
| 5,218,185 | 6/1993 | Gross | 219/528 |
| 5,698,123 | 12/1997 | Tran | 219/492 |
| 5,705,791 | 1/1998 | Sutton et al. | 219/492 |
| 5,844,207 | 12/1998 | Allard et al. | 219/497 |

FOREIGN PATENT DOCUMENTS

| | | | |
|---|---|---|---|
| 573097 | 1/1987 | Australia | A47J 37/08 |

*Primary Examiner*—Teresa Walberg
*Assistant Examiner*—Jeffrey Pwu
*Attorney, Agent, or Firm*—Ernestine C. Bartlett

[57] ABSTRACT

Electric toaster with a first heating element arranged at one side of a toasting compartment and a second heating element arranged at an opposed side of the toasting compartment. The first heating element is divided into two sub-elements. Two diodes and a switch provide the possibility to switch over from a normal two-sided toasting mode to an asymmetric single-sided toasting mode. In the normal mode the switch is closed and the sub-elements receive power only during different half-waves of the mains supply voltage, so that the effective radiant power of the sub-divided first element is equal to the radiant power of the second heating element. In the asymmetric mode the switch is opened and the resistance of the first heating element is greater than the resistance of the second element, as a consequence of which relatively more radiant power is emitted by the first heating element than by the second heating element.

10 Claims, 6 Drawing Sheets

ELECTRIC TOASTER WITH ASYMMETRIC HEATING EFFECT

BACKGROUND OF THE INVENTION

The invention relates to an electric toaster comprising a first heating element and a second heating element, the first and second heating elements being electrically connected in series for receiving an alternating supply voltage, the first heating element being divided into two sub-elements, the sub-elements being interconnected in a first node and switching means for activating and deactivating one of said two subelements.

Such an electric toaster is known from Australian Patent Specification No. 573097, which discloses a toaster which can be switched from a configuration for normal two-sided toasting of slices of bread to a configuration for asymmetric single-sided toasting of pieces of baguette, loaves cut lengthwise, crumpets, muffins or the like. The known electric toaster comprises first and second main heating elements arranged in series arranged at opposite sides of a toasting compartment. A third auxiliary heating element is arranged in series with the first main heating element and physically located on the same support as the first heating element. By means of an electric switch in parallel with the third heating element the third heating element can be switched on and off. In the asymmetric heating mode, when the electric switch is open, the third heating element is operative. Due to the increased resistance of the combined first and third heating elements, more radiant power is generated by this combined heating element than by the second element and one face of the slice of bread is toasted more intensely than the other face. In the normal or symmetric heating mode, when the electric switch is closed, the third heating element is short-circuited and equal radiant power is generated at both sides of the slice of bread. The first and third heating elements have interspersed windings of heating wire upon the same support. The minimum distance between the adjacent turns of the windings has to fulfil certain requirements. This means that the distance between the turns of the winding of the first heating element has to be twice the minimum distance in order to give room for the interspersed turns of the winding of the third heating element. The density of turns of the first heating element thus is lower than possible. The same holds for the second heating element if this element is made of the same heating wire material as the first heating element. As a consequence of the rather coarse winding pattern of the first and second heating elements the irradiation of the slice of bread in the normal mode is not as good as compared with conventional toasters without such asymmetric mode.

SUMMARY OF THE INVENTION

It is therefore an object of the invention to provide an electric toaster with improved toasting performance in the normal and the asymmetric toasting modes.

To this end, according to the invention, the electric toaster as defined in the opening paragraph is characterized in that the switching means for activating and deactivating comprises: a series arrangement of a first unidirectional means and a second unidirectional means connected in parallel with said first heating element, the first unidirectional means and the second unidirectional means having corresponding electrodes interconnected in a second node, and means for interconnecting the first node and the second node.

In the asymmetric mode the two subelements of the first heating element are in series in a fashion as known from the aforementioned Patent Specification. In the normal mode the means for interconnecting are operative to connect the first and second nodes. The first and second unidirectional means, for example diodes connected back-to-back, are conductive only during the positive or negative half periods of the alternating supply voltage. As a consequence, each of the two subelements provides half of the power, assuming the preferred situation that the sub-elements have equal resistances. Since both sub-elements are active in the normal mode, they may be adjacently disposed on a support to form an upper and a lower (or left and right) half of the total radiant surface. Interspersing of heating wires is not required any more and the distance between the turns of the windings of each of the two sub-elements can be set at the desired minimum value to obtain homogenous irradiation. Also the increased number of active heating wires in the normal heating mode provides a more homogeneous toasting effect.

In an embodiment the two sub-elements of the first heating element are composed of turns of heating wire upon a support, the individual turns of the two subelements being located on adjacent parts of the support, and the second heating element is composed of turns of heating wire upon a further support, the number of turns of the second heating element being substantially equal to the sum of the number of turns of the two sub-elements of the first heating element.

Such an arrangement provides good uniform toasting of both faces of the slice of bread in the normal mode.

The means for interconnecting the first node and the second node can be a user-operable electric switch, a relay or a controllable electronic switch, such as a triac. In case of a triac the toaster can be adjusted gradually from normal to asymmetric toasting by suitably controlling the on-off duty cycle of the triac.

In an alternative embodiment the means for interconnecting the first node and the second node is a simple short-circuit and the first and second unidirectional means are thyristors which receive trigger pulses from a controller.

If desired, the other or second heating element can also be divided into two sub-elements and provided with unidirectional elements and interconnecting means. This enables the user to select which face of the slice of bread is to be toasted more intensely. This arrangement has the further advantage that both heating elements can be made of heating wire with the same resistance, contrary to the above arrangement in which the first heating element is preferably composed of two sub-elements each having a winding of N turns and each having a resistance R and in which the second heating element has a winding of 2N turns and also a resistance R. In the latter case the specific resistance of the wire used in the two sub-elements of the first heating element should be higher than the specific resistance of the wire used in the second heating element.

In toasters having two compartments for toasting two slices of bread at the same time, a further second heating element may be series connected to the other end of the subdivided first heating element to form two outer heating elements and a switchable centre heating element. The sub-elements may also be located at the outside of the two compartments, the second heating element being located in the center.

BRIEF DESCRIPTION OF THE DRAWINGS

The above and other features and advantages of the invention will be apparent from the following description of exemplary embodiments of the invention with reference to the accompanying drawings, in which.

Like reference symbols are employed in the drawings and in the description of the preferred embodiments to represent the same or very similar item or items.

DESCRIPTION OF THE PREFERRED EMBODIMENTS

Figure 1:
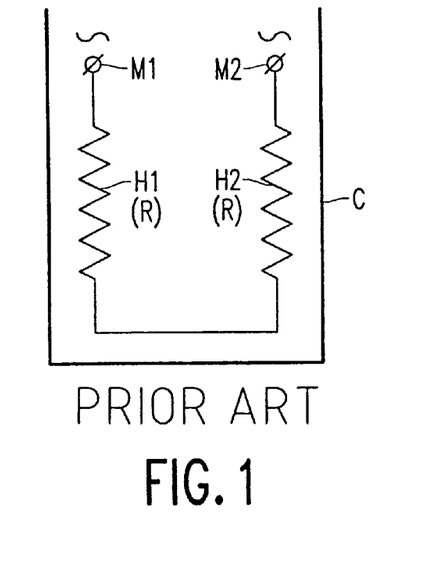
FIG. 1 is a circuit diagram of a conventional toaster without asymmetric toasting facility.

FIG. 1 shows the circuit diagram of a conventional toaster without asymmetric toasting facility. The toaster has two heating elements H1 and H2 disposed at either side of a compartment C. A slice of bread or another food product is inserted between the two heating elements H1 and H2 and toasted at both sides. The two heating elements H1 and H2 are connected in series between terminals M1 and M2 to which an alternating voltage is supplied, for example 220 V AC mains voltage. Each heating element has a resistance R, so the total resistance seen at the terminals M1 and M2 is 2 R. This conventional toaster is not suitable for one-side toasting of pieces of baguette, loaves cut lengthwise, crumpets, muffins or the like with a crust at one side which is not to be toasted.

Figure 2:
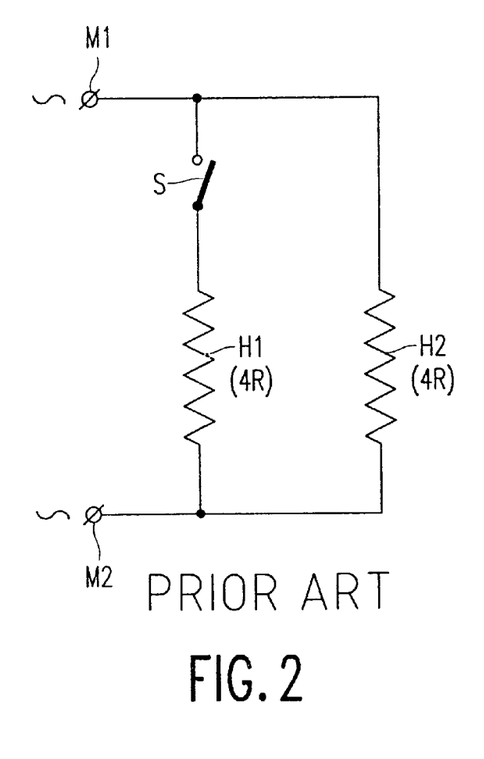
FIG. 2 is a circuit diagram of a first conventional toaster with asymmetric toasting facility.

FIG. 2 shows the circuit diagram of a conventional toaster with the two heating elements H1 and H2 connected in parallel. The heating element H1 can be switched off with a switch S in series with heating element H1. In order to keep the heating power of each element the same as in the configuration of FIG. 1, each heating element should have a resistance 4 R. Such high resistance may cause problems because the wires of the heating elements are rather vulnerable. A resistance 2 R would be a better choice, but in that case the effective mains voltage has to be reduced accordingly by means of triac control. This solution works well, but is rather expensive.

Figure 3:
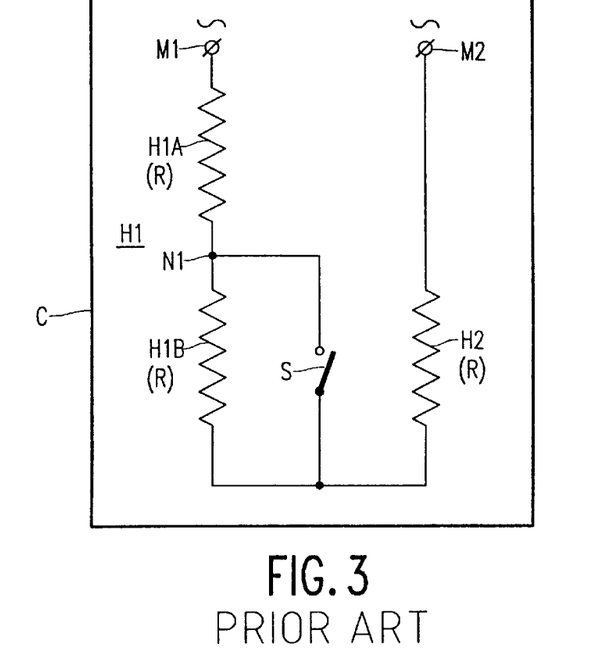
FIG. 3 is a circuit diagram of a second conventional toaster with asymmetric toasting facility.

A cheaper solution is shown in FIG. 3. One-side toasting is obtained by increasing the resistance of one of the heating elements, for example heating element H1, with respect to the resistance of the other heating element H2. For this purpose the heating element is divided into two sub-elements H1A and H1B. Sub-element H1B can be short-circuited with a switch S. The two sub-elements H1A and H1B and the heating element H2 are connected in series between the terminals M1 and M2. The resistances of sub-element H1A and the resistance of heating element H2 are both equal to R. The resistance of sub-element H1B is, by way of example, also equal to R, but any other resistance may be selected as well. When the switch S is closed, the toaster operates in the normal two-sided toasting mode comparable to the configuration shown in FIG. 1. When the switch S is open, relatively more heat is radiated by the two sub-elements H1A and H1B. In the case of equal resistances for the sub-elements and the element H2 two thirds of the power is radiated by the two subelements at one side and one third by element H2 at the other side. This is not true one-side toasting, but in practice the effect is the same.

Figure 4:
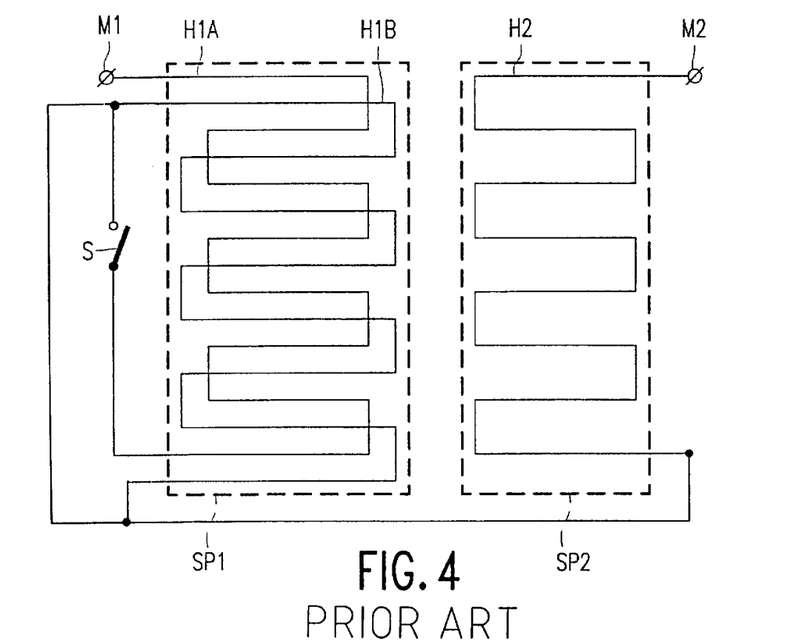
FIG. 4 shows the lay-out of the winding pattern of the heating elements of the toaster of FIG. 3.

The two sub-elements H1A and H1B each consist of a winding of heating wire on a support SP1 as shown in FIG. 4. The turns of the two windings are interspersed (interleaved) because they have to occupy the same area on the support SP1. The minimum distance between the adjacent turns of the windings has to fulfil certain requirements. This means that the distance between the turns of the winding of heating sub-element H1A has to be twice the minimum distance in order to give room for the interspersed turns of the winding of sub-element H1B. The density of turns of sub-element H1A thus is lower than possible. The same holds for heating element H2 on support SP2 if this element is made of the same heating wire material as sub-element H1A. As a consequence of the rather coarse winding pattern of heating sub-element H1A and heating element H2 the irradiation of the slice of bread in the normal mode is not as good as compared with conventional toasters without such asymmetric mode.

Figure 5:
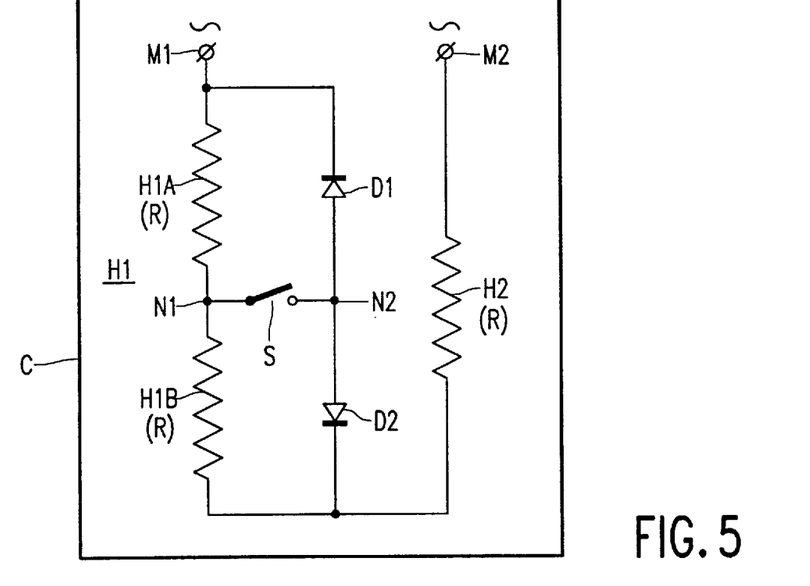
FIG. 5 is a circuit diagram of a first embodiment of a toaster with asymmetric toasting facility according to the invention.

FIG. 5 shows the circuit diagram of a toaster with asymmetric toasting facility according to the invention. The two sub-elements H1A and H1B and the heating element H2 are again connected in series between the terminals M1 and M2. A series arrangement of two diodes D1 and D2 is connected in parallel with the series arrangement of the two sub-elements H1A and H1B. The diodes are interconnected back-to-back, i.e. anode to anode or cathode to cathode, in a node N2. By way of example diodes are shown. Other unidirectional elements such as diode-connected transistors may be used as well. The switch S is arranged between the node N2 and the interconnection node N1 of the two sub-elements H1A and H1B. The resistance of the sub-elements H1A and H1B and of heating element H2 is preferably the same and equal to R. When the switch S is open, the toaster is in the asymmetric mode and operates as explained in relation to FIG. 3, i.e. ⅔ of the power is radiated by the two subelements H1A and H1B at one side and ⅓ by element H2 at the other side. When the switch S is closed, the toaster operates in the normal toasting mode. Diode D1 conducts during negative half-waves of the AC mains voltage and current only flows through sub-element H1B. Diode D2 conducts during positive half-waves of the AC mains voltage and current only flows through sub-element H1A. The resistance seen between the terminals M1 and M2 is equal to 2 R and the heating sub-elements H1A and H1B together radiate as much power as heating element H2.

Figure 6:
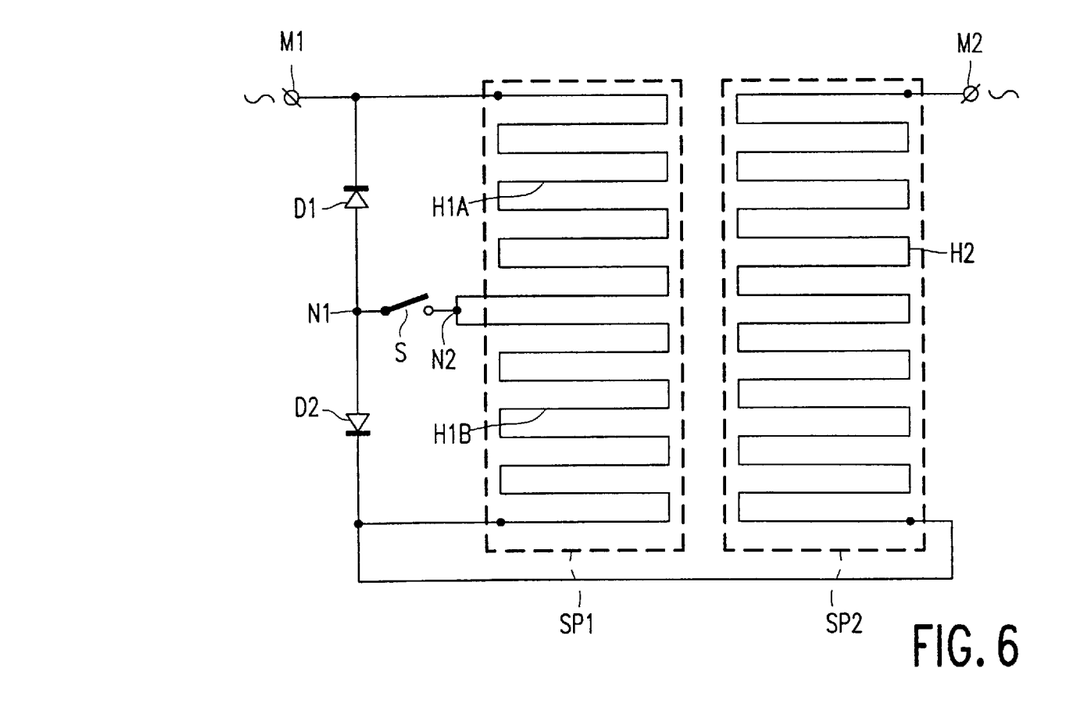
FIG. 6 shows the lay-out of the winding pattern of the heating elements of the toaster of FIG. 5.

As shown in FIG. 6, the windings of sub-elements H1A and H1B are not interspersed (interleaved) but are located on adjacent parts of the support SP1. The number of turns in the winding of sub-element H1A and in the winding of sub-element H1B is half the number of turns in the winding of element H2. In this manner the distribution of the turns of the heating wire can be made equal for both sides of the slice to be toasted and the distance between the turns can be kept as small as practically feasible. In this way an uniform toasting effect can be obtained at both sides.

Since the resistance of the sub-elements H1A and H1B is equal to the resistance of heating element H2, but their number of turns is half the number of turns of heating element H2, the specific resistance of the wire used for the sub-elements is two times as high as that of the wire used for element H2. If this different specific resistance is not desired, the element H2 can also be divided into two sub-elements and can be provided with two diodes and a further switch. All four sub-elements then have the same specific resistance. The further switch provides the option to select which side of the slice is to be toasted. However, the further switch may be omitted and replaced by a permanent connection.

Figure 7:
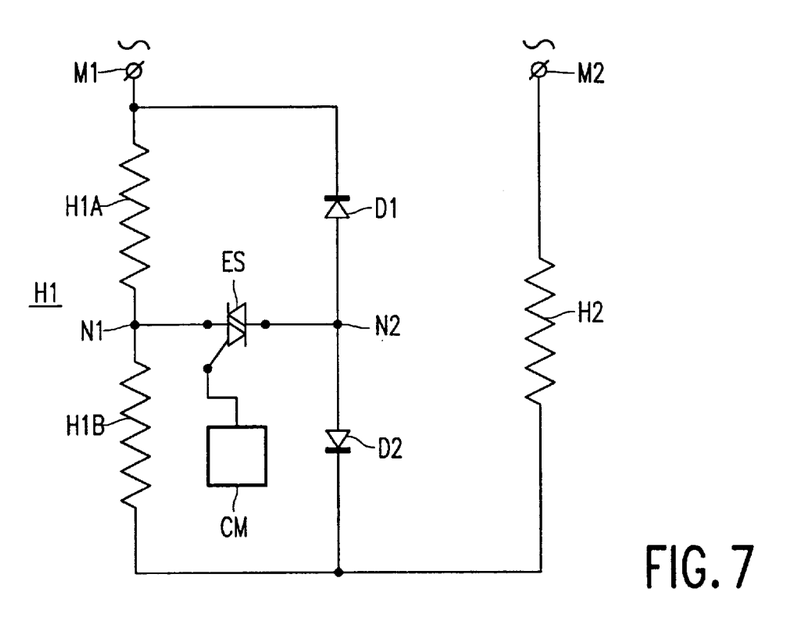
FIG. 7 is a circuit diagram of a second embodiment of a toaster with asymmetric toasting facility according to the invention.

The switch between the first node and the second node can be a user-operable electric switch, a relay or a controllable electronic switch, such as a triac driven by a controller CM to change the on-off duty cycle of the triac, as shown in FIG. 7. In the case of a triac the toaster can be adjusted gradually from normal to asymmetric toasting by suitably controlling the on-off duty cycle of the triac.

Figure 8:
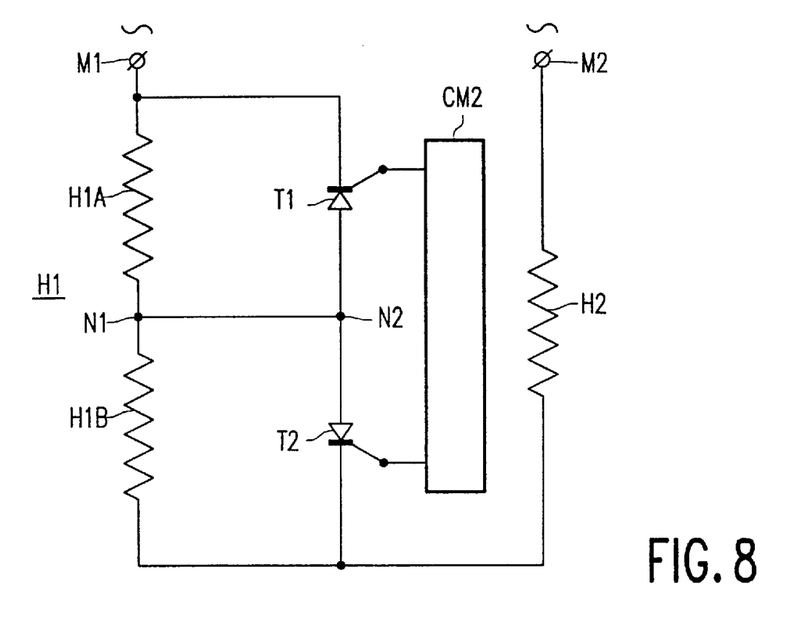
FIG. 8 is a circuit diagram of a third embodiment of a toaster with asymmetric toasting facility according to the invention.

FIG. 8 shows an alternative circuit for the circuits shown in FIGS. 5 and 7. The node N1 and the node N2 are connected directly and the diodes D1 and D2 are replaced by thyristors T1 and T2. The trigger gates of the thyristors T1 and T2 receive trigger pulses from a controller CM2. By continuously triggering both thyristors at the beginning of the corresponding half-wave of the AC mains voltage the effect is the same as in the circuit of FIG. 5 with the switch S closed, i.e. the toaster operates in the normal heating mode. An asymmetric toasting effect is be obtained by stopping the triggering of the thyristors. By changing the on-off ratio, for example by omitting trigger pulses during consecutive cycles of the mains voltage (multi-cycle control of the thyristors), the toasting effect can be changed gradually from asymmetric to normal.

Figure 9:
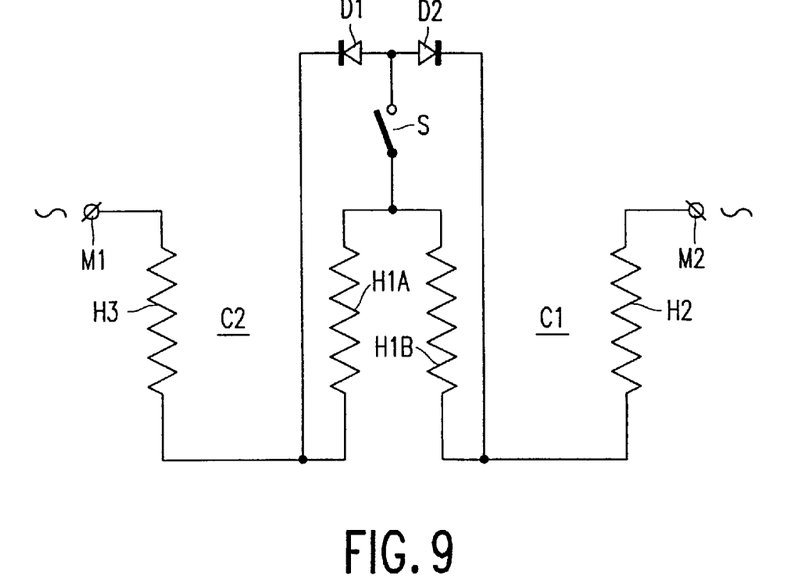
FIG. 9 is a circuit diagram of a fourth embodiment of a toaster with asymmetric toasting facility according to the invention.

FIG. 9 shows a toaster with two compartments C1 and C2 for toasting two slices of bread at the same time, a further second heating element H3 is series connected to the other end of the subdivided first heating element, i.e. between terminal M1 and sub-element H1A, to form two outer heating elements and a switchable centre heating element.

Figure 10:
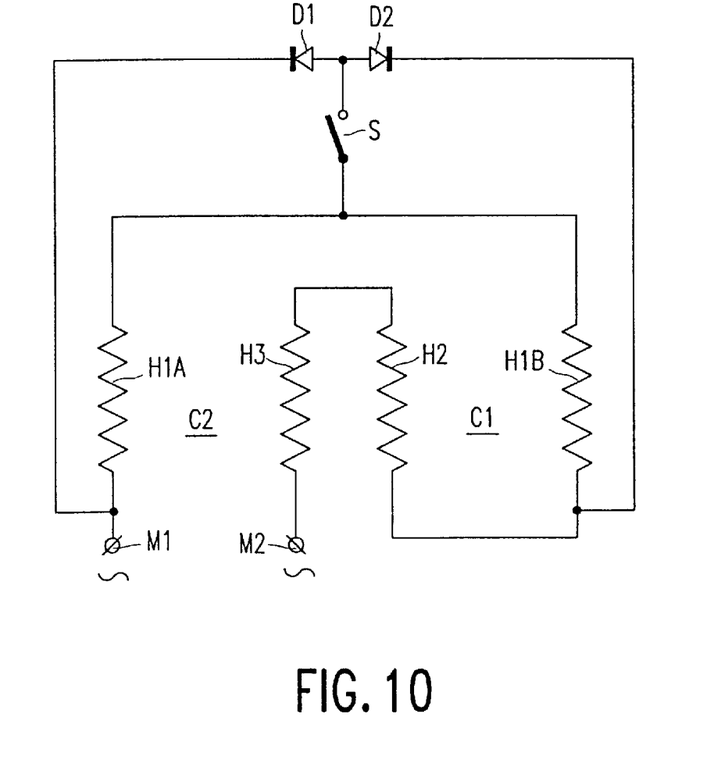
FIG. 10 is a circuit diagram of a fifth embodiment of a toaster with asymmetric toasting facility according to the invention.

FIG. 10 shows an alternative arrangement for a toaster with two compartments C1 and C2. The switchable sub-elements H1A and H1B are here located at the outer side of the compartments C1 and C2 and the second heating element H2 and the further second heating element H3 are located in the centre. The turns of the windings of elements H2 and H3 may be interspersed on a single support or may be accommodated on separate supports.

Figure 11:
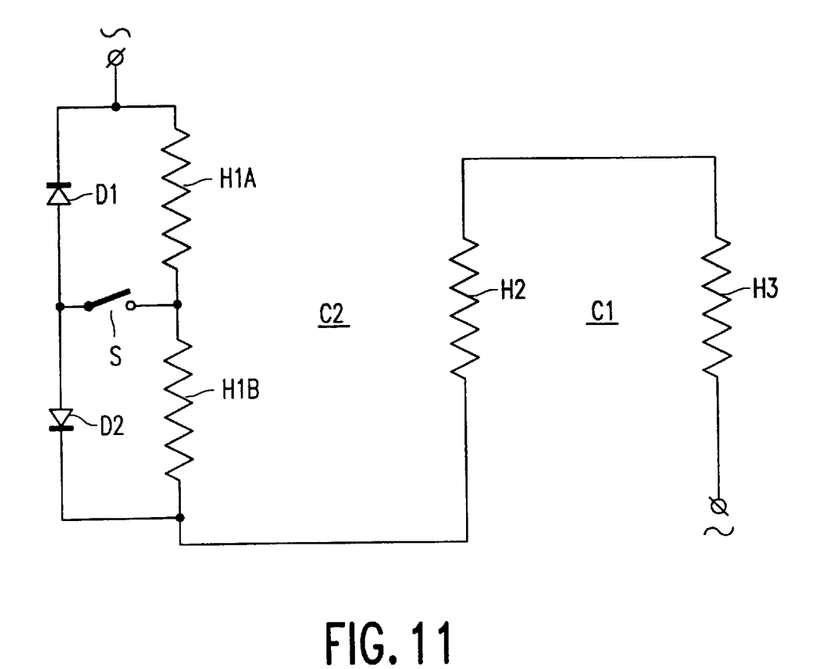
FIG. 11 is a circuit diagram of a sixth embodiment of a toaster with asymmetric toasting facility according to the invention.

FIG. 11 shows a second alternative arrangement for a toaster with two compartments C1 and C2. The switchable sub-elements H1A and H1B are located at the outer side of compartment C2. This arrangement allows two-sided toasting of one slice of bread in a toaster with two compartments. When only one slice of bread is placed in one of the compartments, the inner face of the slice is toasted faster than the outer face. This is due to the fact that in the free compartment the radiation from the outer element heats up the element in the centre. The arrangement with the switchable subelements H1A and H1B can be used to compensate for this effect.

The embodiments of the present invention described herein are intended to be taken in an illustrative and not a limiting sense. As shown in the Figures, various modifications may be made to these embodiments by persons skilled in the art without departing from the scope of the present invention as defined in the appended claims.

We claim:

1. An electric toaster comprising a first heating element and a second heating element, the first and second heating elements being electrically connected in series for receiving an alternating supply voltage, the first heating element being divided into two sub-elements electrically connected in series and defining a first node where the sub-elements are connected together, and switching means for effectively deactivating alternate ones of said two sub-elements during alternate half cycles of a selectable mode of heating operation, wherein the switching means for effectively deactivating comprises: a series arrangement of a first unidirectional element and a second unidirectional element electrically connected in parallel with said first heating element, the first unidirectional element and the second unidirectional element having corresponding electrodes connected together at a second node, and means for interconnecting the first node and the second node.

2. An electric toaster as claimed in claim 1, wherein each of the two sub-elements of the first heating element has a resistance substantially equal to the resistance of the second heating element.

3. An electric toaster as claimed in claim 1, wherein the two sub-elements of the first heating element are composed of turns of heating wire upon a support, the individual turns of the two subelements being located on adjacent parts of the support.

4. An electric toaster as claimed in claim 3, wherein the second heating element is composed of turns of heating wire upon a further support, the number of turns of the second heating element being substantially equal to the sum of the number of turns of the two sub-elements of the first heating element.

5. An electric toaster as claimed in claim 1, wherein the means for interconnecting comprises a user-operable electrical switch.

6. An electric toaster as claimed in claim 1, wherein the means for interconnecting comprises a bidirectional controllable electronic switch, and in that the electric toaster further comprises means for controlling an on-off duty cycle of the electronic switch.

7. An electric toaster as claimed in claim 6, wherein the first and second unidirectional elements comprise diodes.

8. An electric toaster as claimed in claim 1, wherein the first unidirectional element and the second unidirectional element comprise thyristors, the means for interconnecting is a short-circuit between the first node and the second node, and the electric toaster further comprises means for triggering the thyristors.

9. An electric toaster as claimed in claim 7, wherein the means for triggering is operable to provide trigger pulses to the thyristors, which trigger pulses are present during selected ones of cycles of the alternating supply voltage.

10. An electric toaster for providing selectably symmetric or asymmetric toasting, comprising; a first heating element and a second heating element electrically connected in series for receiving a heating current from an alternating supply voltage, the first heating element being divided into two sub-elements electrically connected in series, the sub-elements being electrically connected together at a first node, and switching means for alternately bypassing one of said two sub-elements with the heating current during at least a portion of each half cycle of the alternating supply voltage, wherein the switching means for alternately bypassing comprises: a series arrangement of a first unidirectional element and a second unidirectional element electrically connected in parallel with said first heating element, the first unidirectional element and the second unidirectional element having corresponding electrodes connected together at a second node, and means for interconnecting the first node and the second node.

* * * * *